United States Patent

Payton et al.

[11] Patent Number: 5,955,884
[45] Date of Patent: Sep. 21, 1999

[54] METHOD AND APPARATUS FOR MEASURING TRANSIENT ELECTROMAGNETIC AND ELECTRICAL ENERGY COMPONENTS PROPAGATED IN AN EARTH FORMATION

[75] Inventors: Christopher C. Payton; Kurt-M. Strack; Leonty A. Tabarovsky, all of Houston, Tex.

[73] Assignee: Western Atlas International, Inc., Houston, Tex.

[21] Appl. No.: 08/883,539

[22] Filed: Jun. 26, 1997

Related U.S. Application Data

[63] Continuation of application No. 08/591,901, Jan. 25, 1996, abandoned, which is a continuation of application No. 08/290,593, Aug. 15, 1994, abandoned.

[51] Int. Cl.$^6$ ........................................................ G01V 3/28
[52] U.S. Cl. ................................................................ 324/339
[58] Field of Search .................................... 324/338–393; 73/152; 364/422; 702/6, 7, 11

[56] References Cited

U.S. PATENT DOCUMENTS

| | | | |
|---|---|---|---|
| 4,481,472 | 11/1984 | Gianzero | 324/339 |
| 4,724,390 | 2/1988 | Rauscher et al. | 324/258 |
| 5,115,198 | 5/1992 | Gianzero et al. | 324/339 |

FOREIGN PATENT DOCUMENTS

| | | | |
|---|---|---|---|
| 795919 | 10/1968 | Canada | 324/334 |

Primary Examiner—Walter E. Snow
Attorney, Agent, or Firm—Darryl M. Springs

[57] ABSTRACT

A single well transient electromagnetic ("TEM") apparatus and method is disclosed. The invention includes a wireline logging tool adapted for disposition in a borehole drilled in earth formations that has mounted thereon an electromagnetic transmitter and electric field transmitter for applying electromagnetic energy to the formation that will maximize the radial depth of penetration of the energy into the formation. The logging tool further includes an electromagnetic receiver and electric field receiver for detecting the electric field and magnetic field components created in the formation by the TEM transmitter. The electromagnetic transmitter and receiver preferably comprise three-axis electromagnetic coils, and the electric field transmitter and receiver preferably comprise three-axis electric dipole antenna elements. The tool may employ an array of the TEM transmitters and TEM receivers spaced axially along the tool in the borehole.

41 Claims, 5 Drawing Sheets

METHOD AND APPARATUS FOR MEASURING TRANSIENT ELECTROMAGNETIC AND ELECTRICAL ENERGY COMPONENTS PROPAGATED IN AN EARTH FORMATION

This is a continuation of application Ser. No. 08/591,901 filed on Jan. 25, 1996 (unintentionally abandoned and in which a petition to revive is being filed simultaneously) which is a continuation of application Ser. No. 08/290,593 filed on Aug. 15, 1994 (now abandoned).

FIELD OF THE INVENTION

The present invention relates to apparatus and methods for investigating formation zones surrounding a borehole using transient electromagnetic measuring techniques.

BACKGROUND OF THE INVENTION

Energy exploration and exploitation using boreholes drilled into earth formations require the monitoring and evaluation of physical conditions, such as the resistivity or conductivity of the earth formations around a single borehole, often up to a radial distance of several hundred meters from the borehole, or in the space between two boreholes which are separated by a distance of several hundred meters or more. An example of the above is the current conventional reservoir monitoring using cross-well tomography. However, traditional logging techniques typically do not permit the radial investigation of the earth formations surrounding a single borehole up to distances exceeding 2–3 meters at best. Mining operations have utilized transient electromagnetic measurement techniques for resistivity/conductivity in which a large surface dipole antenna (often several hundred meters in length) is utilized with a transient electromagnetic receiver located in a borehole drilled in the earth to make measurements in vertical and horizontal zones in the earth surrounding the borehole and between the borehole and the earth's surface.

There are generally two possible ways to excite electromagnetic fields: frequency domain excitation (including direct currents [DC] in the zero frequency limit), and time domain excitation to generate transients. Frequency domain excitation is based on the transmission of a continuous wave of a fixed (or sometimes even mixed) frequency and the measuring of the response at the same band of frequencies. Discrete frequencies are linked through the skin depth (Kaufman and Keller, 1983) to certain formation volumes. Time domain excitation employs a square wave signal (or pulses, triangular waveforms or pseudo random binary sequences) as a source and the broadband earth response is measured. When the transmitter current is switched abruptly, the signals appearing at a receiver caused by the induction currents in the formation by a transmitted signal are called transients, because the receiver signals start at a certain value and then decay (or increase) with time to a constant level.

One major problem of alternating current (AC) measurements in the frequency domain excitation is the strong coupling between transmitter and receiver, known as the direct mode. The direct mode arises from the magnetic field caused directly by the current in the transmitter loop. This phenomenon puts severe restrictions on the achievable accuracy of measurements and, as a result, on a range of measurable formation resistivities. A problem of direct current (DC) excitation (when frequency goes to zero) is that the measured signal is a composite signal comprising a mixture of contributions derived simultaneously from different regions. This will drastically deteriorate the possible practical resolution available by such methods. The commonly implemented ways to enhance resolution of frequency domain measurements are either to design multi-coil devices permanently focused on certain spatial areas of formation such as conventional borehole induction measurement tools, or to use an array of measurements and multi-target processing techniques to allow numerical focusing of the measurement onto a certain predetermined region in space such as using array-type induction or laterolog measurement tools. In both cases, the problem is that the resulting net signal is very small compared to the original total measured signal which means that a high accuracy and resolution of raw measurements is required. In addition, if multiple transmitter-receiver configurations are used, differential processing techniques can significantly improve vertical and radial resolution of the measurements.

In contrast, however, time domain signals are inherently not lumped, and spatial filtering of time domain (transient) data allows more direct computation and precise separation of component responses. The primary signal which does not contain information about the earth medium parameters and is very large is not included in the transient mode measurement. Moreover, a properly excited transient field (such as a switch-off impulse) does not have a direct mode problem, which means that the whole measured signal is characterized primarily by the features of the resistivity distribution in the surrounding space.

The ability to separate in time the response of different spatial areas is an important characteristic of the transient electromagnetic field. After switching off the transmitter current induced currents of the same geometry appear in the nearby area due to Faraday's law. Not being supported by extraneous forces, this current begins diffusion to the outer space. This diffusion is followed by attenuation and dispersion in which the spatial resolution in the later time stage becomes significantly reduced.

However, transient field data in the later time stages have proved to be more sensitive to the distant formation resistivity than frequency domain or DC-data (Kaufman and Keller, 1983); (Strack, 1992). What is known as geometric factor contribution in the frequency domain, based on Doll's approximation (Doll, 1949), does not participate at all in the latest time stage of the transient electromagnetic measurement technique. This gives a unique opportunity to combine both transient and frequency domain measurements to utilize the complementary information they contain.

Historically, measurements of formation characteristics in a borehole have been accomplished for very near-to-the-borehole radial distances. The electromagnetic noise in the borehole is much lower than at the surface because the earth acts as an exponential lowpass filter. Because of the small size of the borehole and the harsh environmental conditions, an electromagnetic measuring instrument is, as a practical matter, restricted in the amount of sophistication that can be reliably constructed in the instrument. To overcome such restrictions, the more easily implemented frequency domain electromagnetic measurement methods have been chosen as a basis for the measurement of formation characteristics using logging tools such as induction and laterolog tools.

Only recently (Tabarovsky et al., 1992) has it been possible to model reasonably realistic borehole transient electromagnetic situations. Parallel to such developments in the area of numerical modelling, the electronic capabilities in high power switching, amplifier design and data transmission have improved, thereby making a time domain borehole system feasible. The limitation on the radial depth or range of investigation in deep measuring transient electromagnetic investigation is determined primarily by the signal-to-noise level of the measurements, which are related to the available impulse energy and to the measurable signal levels.

The task of interpreting deep radial electromagnetic soundings in a formation of interest can be simplified if the structure of the boundaries is obtained or approximated from other geophysical data (gravity, seismic, borehole logs, geologic surveys, etc.). This additional information, for example, can be used to keep certain parts of the earth parameters fixed while interpreting for the others.

The prior art and the relationship between frequency (continuous wave) and transient electromagnetics is well described in two geophysical monographs by Kaufman and Keller (1983) and Strack (1992). The latter also described the required necessary improvement in hardware design for highly sensitive measurement (Rueter and Strack, 1991). For mining applications, the use of the transient electromagnetic method is fairly common and documented in numerous publications (i.e.: Crone, 1985; Thomas, 1987). Modeling of the transient response started fairly early (Lech, 1975) but has been restricted to a fairly simple and approximate models (Jarzyana, 1979; Chew et al., 1981; Eaton and Hohmann, 1984; Raiche and Bennett, 1987; Lee and Buselli, 1987; Thomas, 1987; West and Ward, 1988; Anderson and Chew, 1989, Liu and Shen, 1991). Only with the advent of new modeling codes (Tabarovsky et al.) could a more realistic investigation beyond the basic feasibility as described by Anderson and Chew (1989) be accomplished.

SUMMARY OF THE INVENTION

The problems of the prior art are overcome by the provision of a single well transient electromagnetic ("TEM") apparatus and method according to the disclosed invention. The invention includes a wireline logging tool adapted for disposition in a borehole drilled in earth formations that has mounted thereon at least one electromagnetic transmitter and at least one electric transmitter for applying electromagnetic energy to the formation at selected frequencies and waveforms that will maximize the radial depth of penetration of the magnetic and electric energy into the target formation. The electromagnetic transmitter and the electric transmitter may be either a single-axis or a multi-axis electromagnetic and/or electric transmitter, preferably three-axis, and may be combined together in one transmitter unit or module. The logging tool further includes at least one magnetic field receiver and at least one electric field receiver for detecting the electric field and magnetic field components created in the formation by the TEM transmitter. Similarly, the magnetic and electric transmitter may be single-axis or multi-axis magnetic and/or electric transmitter, preferably three-axis, and may be combined together in one receiver unit or module. If the transmitter and receiver use multi-axis units, the magnetic transmitter and receiver may comprise two-axis or three-axis oriented coils, and the electric field transmitter and receiver may comprise two-axis or three-axis oriented electric dipole elements. The tool may employ an array of the TEM transmitters and TEM receivers spaced axially along the tool in the borehole.

In one embodiment, the TEM transmitters and TEM receivers are separate modules that are spaced apart and interconnected by lengths of cable for gravity implemented descent into a borehole, with the TEM transmitter and TEM receiver modules being separated by an interval or distance of one meter up to 200 meters as selected. In another embodiment, the TEM transmitter and TEM receiver modules are interconnected by pipe or tubing sections to make the tool rigid for non-gravity delivery of the tool into deviated boreholes or boreholes having difficult conditions by drill pipe or tubing or coiled tubing delivery methods.

In each such embodiment, three-axis orthogonal seismic receivers may be included in the tool string for detecting simultaneous borehole seismic energy received from an optional seismic energy source located at the surface adjacent the borehole or in the borehole or spaced adjacent the borehole. In addition, suitable conventional orientation devices such as a triaxial magnetometer, an accelerometer and/or a gyro, could be included in the TEM transmitters and the TEM receivers for determining the individual orientation of each unit. The frequency and amplitude of the TEM transmitter current signals can be varied to accomplish the equivalent of rotating the angular relationship of the multi-axis magnetic coils and the multi-axis electric field dipole elements to obtain multiple ranges and angular relationships in the measurement process.

Accordingly, one primary feature of this invention is the use of TEM measuring apparatus and methods in a single borehole where both electromagnetic transmitter and electromagnetic receiver are conveyed simultaneously into the same borehole.

Another primary feature of the present invention is the use of TEM receivers in the borehole which monitor electrical and magnetic field characteristics in single or multiple axes, or in single or multiple axes plus additional sensors for specific angular resolution.

Still another feature of the present invention is the use of TEM transmitters in the borehole which excite magnetic coils and electric dipoles in each of multiple axes.

Another feature of this invention is the use of an array of multiple TEM transmitters and receivers incorporated into an integrated measuring instrument, which facilitates the collection of multiple data sets from any given instrument location in the borehole.

Yet another feature of this invention is that individual TEM transmitters and receivers can be optimized for particular powers, geometries, and response characteristics for a particular range of depths of investigation and/or particular formation characteristics.

Still another major feature of the present invention is that the TEM transmitters and receivers of the invention can be oriented in space by incorporating suitable orientation devices with the respective components.

Another feature of this invention is the use of means for spacing the TEM receivers to optimize the distance between the receiver modules for optimum compensation of borehole effects and electromagnetic noise.

BRIEF DESCRIPTION OF THE DRAWINGS

In order that the manner in which the above-identified principles and features of the invention are attained can be understood in detail, a more particular description of the invention may be had by reference to specific embodiments thereof which are illustrated in the accompanying drawings, which drawings form a part of this specification.

In the drawings.

DETAILED DESCRIPTION OF THE PREFERRED EMBODIMENTS

Figure 1:
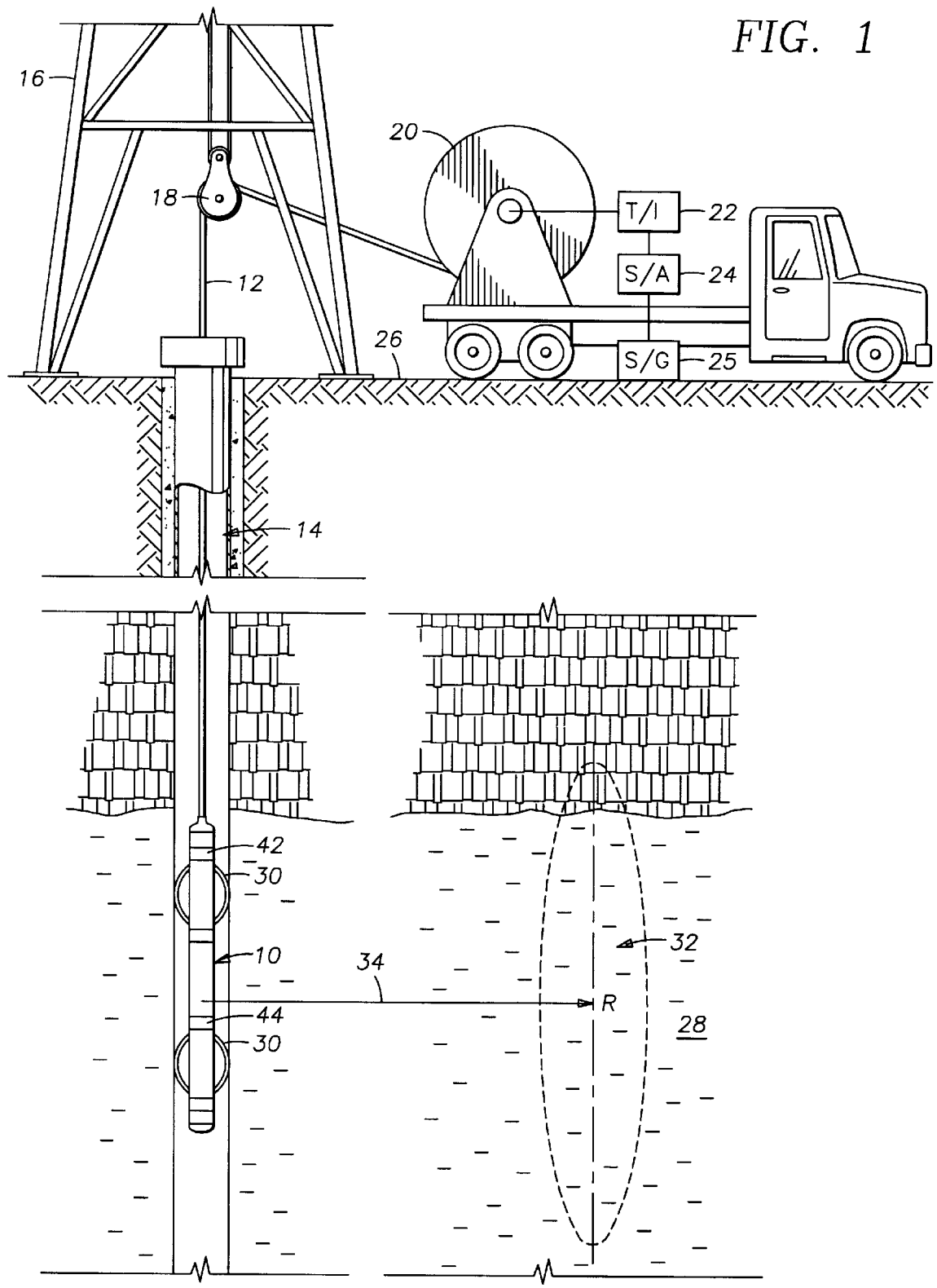
FIG. 1 is a pictorial schematic showing the transient electromagnetic measuring tool according to this invention disposed in a borehole drilled into an earth formation.

In FIG. 1, the transient electromagnetic measuring tool 10 according to this invention is shown disposed in a borehole 14 and supported by a wireline cable 12. The tool 10 may be centralized in the borehole 14 by means of conventional centralizers 30. The cable 12 is supported by a sheave wheel 18 disposed in a drilling rig 16 in a conventional manner and is wound on a drum 20 for lowering or raising the tool 10 in the borehole in a conventional manner. The cable 12 is a conventional multi-strand cable having electrical conductors for carrying electrical signals and power from the surface to the tool 10 and for transmitting data measured by the tool to the surface for processing. The cable 12 is interconnected in a conventional manner to a telemetry interface circuit 22 and a surface acquisition unit 24. For purposes to be further explained, a seismic generator 25 may optionally be included for generating seismic signals for detection by the tool 10, and is also shown interconnected to the surface acquisition unit 24.

The tool 10 includes TEM transmitter(s) 42 and TEM receiver(s) 44, and associated components such as power supplies, controllers, orientation devices, and interconnects (not shown). The TEM transmitter(s) 42 and TEM receiver (s) 44, as will hereinafter be further explained, are capable of investigating and measuring resistivity in a "deep" zone 32 in the earth formations 28 that is radially disposed at a distance R as shown by the radial line 34. This radial distance R may be a distance of about 300 meters or more.

Figure 2A:
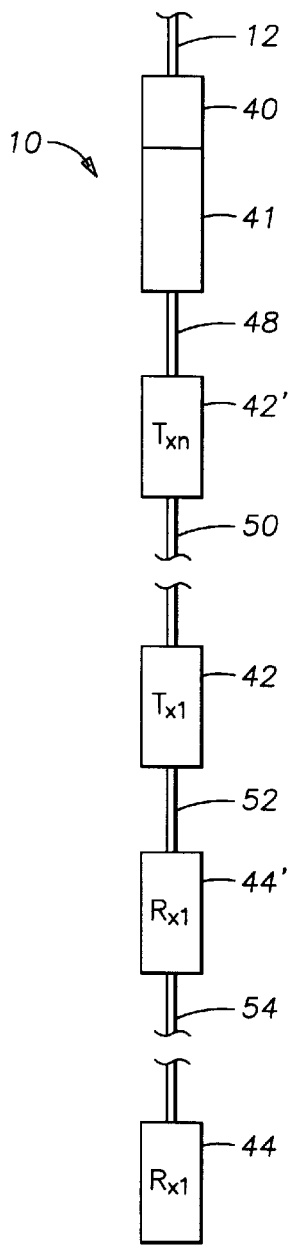
FIG. 2A is a side elevation view of one embodiment of the transient electromagnetic measuring tool according to this invention.
Figure 2B:
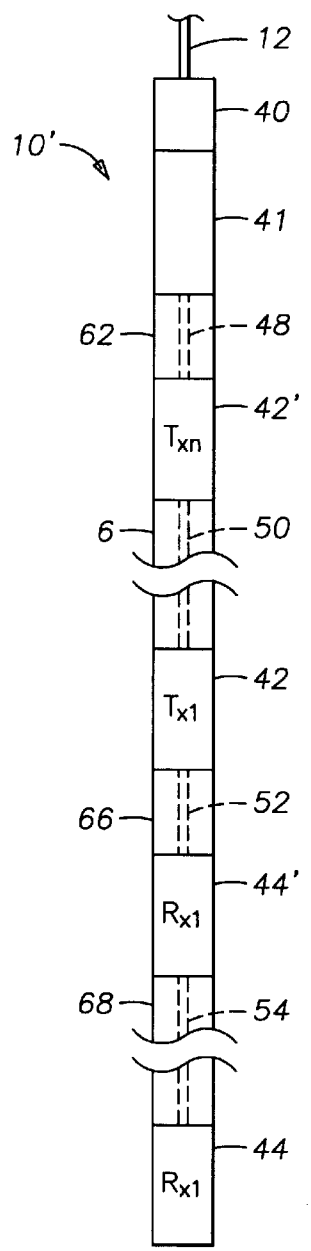
FIG. 2B is a side elevation view of another embodiment of the transient electromagnetic measuring tool according to this invention.

Referring now to FIGS. 1, 2A and 2B, the construction of certain embodiments of the tool 10 will be explained in greater detail. The first embodiment is shown in FIG. 2A, with the wireline cable 12 shown connected to a telemetry interface module 40 for providing a digital telemetry interface for interconnecting tool 10 to the cable for telemetry of information and data to the surface (FIG. 1) and a controller module 41 for controlling the operation of tool 10. In an optional embodiment, the controller module 41 may also include a computer processing unit for accomplishing certain processing steps downhole in the tool. A plurality of TEM transmitter modules 42–42' ($Tx_1 \ldots Tx_n$) are shown axially disposed below the controller module 41 and interconnected thereto by means of cable sections 48 and 50. Each of the plurality of TEM transmitter modules 42–42' preferably contain either single or multi-axis electric dipole and electromagnetic antennas, as will be hereinafter further explained, for applying electrical and magnetic energy in the form of selected TEM components to the formation 28.

Spaced axially below the plurality of TEM transmitters 42–42' ($Tx_1 \ldots Tx_n$) are a plurality of TEM receiver modules 44–44' ($Rx_1 \ldots Rx_n$) and interconnected to the TEM transmitters 42–42' by means of cable sections 52 and 54. Each of the plurality of TEM receiver modules 44–44' preferably contain either single or multi-axis electric dipole elements and electromagnetic receivers or coils, as will be hereinafter further explained, for detecting the received electrical and magnetic energy in the form of selected TEM components from the formation 28. As shown in FIG. 2A, the modules are interconnected by multi-conductor armored electrical cable or fiber-optic cable sections 48, 50, 52 and 54 for use in boreholes 14 where the deviation of the borehole and borehole conditions permit lowering of the tool 10 into the borehole as a result of gravitational force.

Another embodiment 10' of the invention is shown in FIG. 2B, with the wireline cable 12 shown connected to a telemetry interface module 40 and a controller module 41 as described in connection with FIG. 2A. A plurality of TEM transmitter modules 42–42' ($Tx_1 \ldots Tx_n$), identical to the transmitter modules 42–42' as described in FIG. 2A, are shown axially disposed below the controller module 41 and interconnected thereto by means of cable sections 48 and 50. Spaced axially below the plurality of TEM transmitters 42–42' ($Tx_1 \ldots Tx_n$) are a plurality of TEM receiver modules 44–44' ($Rx_1 \ldots Rx_n$), identical to the receiver modules 44–44' as described in FIG. 2A, and are interconnected to the TEM transmitters 42–42' by means of cable sections 52 and 54.

However, in this embodiment, pipe or tubing sections 62, 64, 66 and 68 are utilized to mechanically interconnect the transmitter modules 42–42' ($Tx_1 \ldots Tx_n$) and the receiver modules 44–44' ($Rx_1 \ldots Rx_n$) for enabling the tool 10' to be utilized in deviated boreholes or where descent of the cable-connected modules of the first embodiment 10 may be difficult due to borehole conditions. For closer spacings of the TEM transmitter modules 42–42' and the TEM receiver modules 44–44', the modules may be assembled into a continuous tool with no cable spacer sections such as tubing sections 62, 64, 66 or 68. In deviated wells, where gravity does not operate as an effective descent mechanism, the tool 10' may be inserted into the borehole 14 by means of conventional drill pipe or tubing or coiled tubing delivery systems.

In the embodiments 10 and 10' as described above, the number of TEM transmitters 42 and 42' and TEM receivers 44 and 44' may vary, depending on the desired axial spacing in the borehole and the desirability of collecting multiple data sets from a given tool location in the borehole. The spacing of the TEM transmitter modules 42–42' and the TEM receiver modules 44–44' can vary from a minimum distance between a single TEM transmitter module 42 and a single TEM receiver module 44 of about one meter and combinations of up to 200 meters axially in the borehole. All of the modules, including the telemetry interface module 40, the controller module 41 and the TEM transmitter and receiver modules 42–42' and 44–44', respectively, are packaged in pressure housings typical of downhole logging tools in order to protect the electronic components from pressure, temperature, stress, moisture and corrosion. of course, other conventional wireline logging instruments (i.e., induction, laterolog, etc.) may be combined and interconnected into the tool string of the tool embodiments 10 and 10' by conventional coupling and interconnection devices (not shown).

Figure 3A:
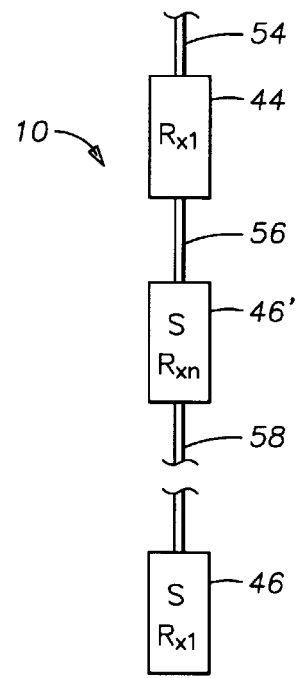
FIG. 3A is a partial side elevation view of an optional variation of the embodiment of the invention shown in FIG. 2A, including added borehole seismic receivers.
Figure 3B:
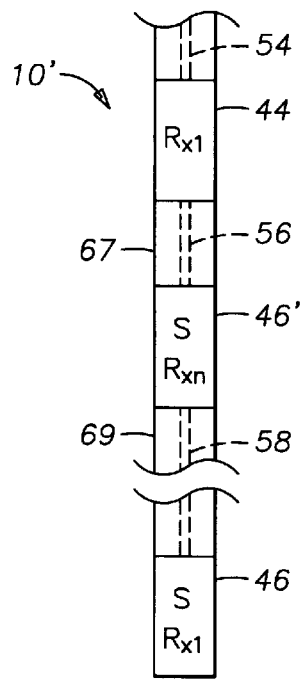
FIG. 3B is a partial side elevation view of an optional variation of the embodiment of the invention shown in FIG. 2B, including added borehole seismic receivers.

FIGS. 3A and 3B show optional seismic receivers 46–46' that may be added to the tools 10 or 10' as described above with reference to FIGS. 2A and 2B by receiving seismic signals reflected from the formations of interest from a seismic energy generator 25 (FIG. 1). The seismic receivers 46–46' may be utilized to take advantage of the additional formation information available utilizing borehole seismic techniques which will greatly complement the TEM information. In FIGS. 3A and 3B, a plurality of seismic receivers 46–46' ($SRx_1$ ... $SRx_n$) are shown axially disposed below the last TEM receiver 44 ($Tx_1$) and interconnected thereto by means of cable sections 56 and 58. The seismic receiver modules 46–46' may preferably be any conventional orthogonal borehole seismic receiver instrument, such as the seismic receiver disclosed in U.S. Pat. No. 4,893,290. As more particularly shown in FIG. 3B, pipe or tubing sections 67 and 69 are utilized to interconnect the receiver module 44 ($Rx_1$) and the seismic receiver modules 46–46' ($SRx_1$ ... $SRx_n$) for use in deviated boreholes as hereinabove described in reference to FIG. 2B.

Figure 4:
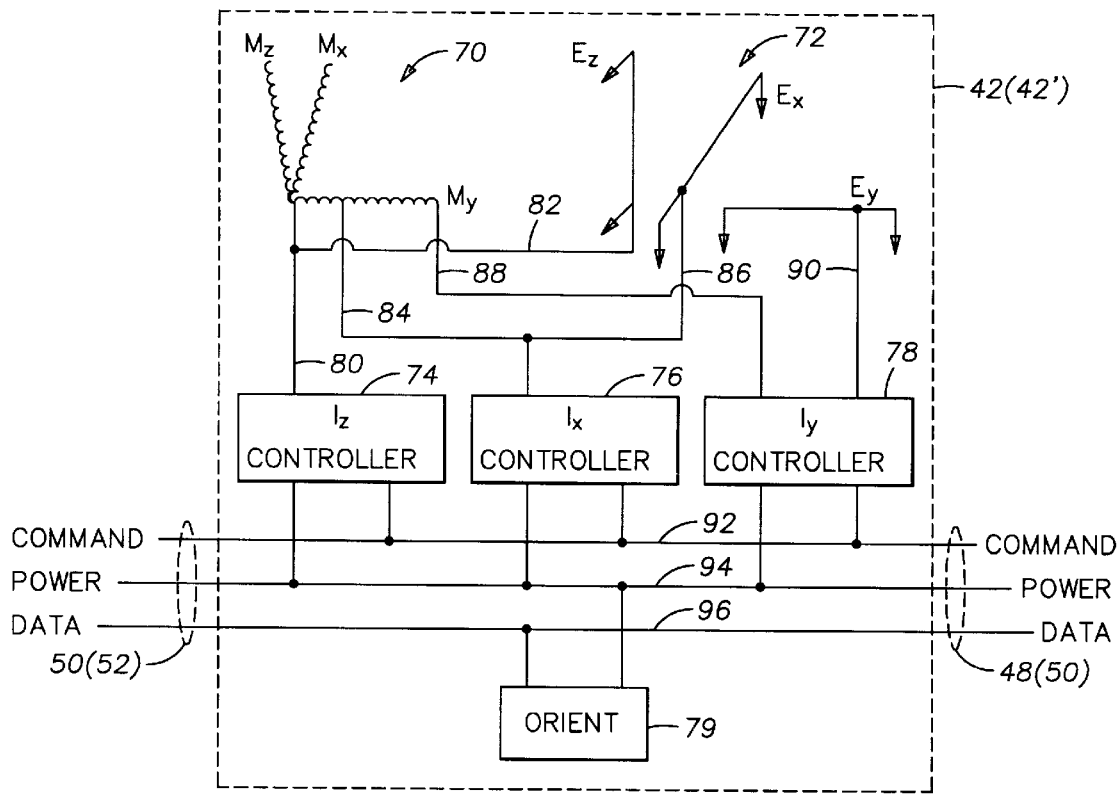
FIG. 4 is a block diagram schematic of a transmitter module of the transient electromagnetic measuring tool shown in FIGS. 2A and 2B.

A typical TEM transmitter module 42(42') is shown in schematic form in FIG. 4. While either single or multi-axis transmitter modules may be employed, the preferred transmitter module 42(42') ($Tx_1$ ... $Tx_n$) as shown in FIG. 4 contains a three-axis magnetic transmitter 70 (comprising orthogonal coils $M_x$, $M_y$ and $M_z$), a three-axis electric transmitter 72 (comprising orthogonal dipole antenna elements $E_x$, $E_y$ and $E_z$) and an orientation device 79. The three-axis magnetic transmitter 70 and three-axis electric transmitter 72 are connected to three current controllers 74, 76 and 78 for controlling the transmitting currents $I_x$, $I_y$ and $I_z$ applied to the transmitters 70 and 72. The respective orthogonal coils $M_x$, $M_y$ and $M_z$, and the respective orthogonal dipole antenna elements $E_x$, $E_y$ and $E_x$ are interconnected to the respective $I_x$, $I_y$ and $I_z$ controllers 76, 78 and 74, respectively. Power to the current controllers 74, 76 and 78, and the orientation unit 79 is provided by conductor 94 appearing in the cable segments 48 (50) and 50 (52), and command or control signals are provided through conductor 92. Conductor 96 provides a path for the data signals received from the TEM receiver modules 44–44' as will be hereinafter further described. The orientation device or unit 79 may conveniently be a triaxial magnetometer and accelerometer and/or a gyro. In certain circumstances, the magnetometer could be the same as that used for the TEM magnetic field measurement.

The current controllers 74, 76 and 78 may be controlled from the surface by the surface acquisition unit 24 (FIG. 1), or the control functions may be included in a processor provided downhole in tool 10 in the controller unit 41 as hereinabove described with respect to FIGS. 2A and 2B. Control parameters can either be downloaded and pre-stored, or they can be controlled in real time during the logging operation. The current controllers 74, 76 and 78 can control the complete magnetic transmitter 70 and the complete electric transmitter 72. However, simultaneous operation of multiple TEM transmitter modules 42 (42') ($Tx_1$ ... $Tx_n$) require special synchronization as will hereinafter be further described. The individual TEM transmitter components, especially if there are multi-axis units (the x-, y-, z-directions), are de-coupled from each other to avoid interference from slight changes of the transmitter current input waveform. In some cases, as with the electric dipole antenna elements, the center dipole elements are located very close to each other but are not directly electrically connected in order to avoid possible crosstalk between the input signals caused by mutual inductances and capacitative discharges.

Figure 5:
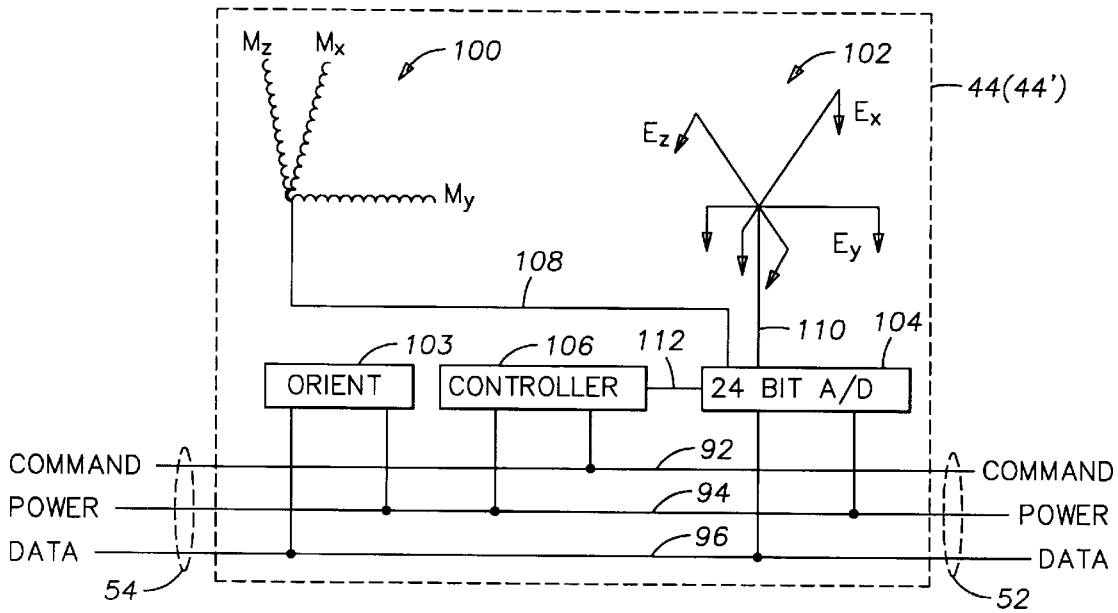
FIG. 5 is a block diagram schematic of a receiver module of the transient electromagnetic measuring tool shown in FIGS. 2A and 2B.

A schematic of the TEM receiver module 44 (44') ($Rx_1$ ... $Rx_n$) is shown in FIG. 5. While either single or multi-axis receiver modules may be employed, the preferred TEM receiver module 44 (44') ($Rx_1$ ... $Rx_n$) as shown in FIG. 5 contains a three-axis magnetic receiver 100 (comprising orthogonal coils $M_x$, $M_y$ and $M_z$), a three-axis electric field receiver 102 (comprising orthogonal dipole antenna elements $E_x$, $E_y$ and $E_z$) and an orientation device 103, that may be any conventional accelerator or magnetometer orientation unit. The currents generated in the orthogonal electromagnetic coils $M_x$, $M_y$ and $M_z$ by the magnetic fields induced in the formation by the transmitter coils of the transmitter modules 42 (42') create analog voltage signals applied to a 24-bit analog-to-digital (A/D) converter 104 through conductor 108 for conversion to digital signals. The currents generated in the orthogonal dipole antenna elements $E_x$, $E_y$ and $E_z$ by the electric fields induced in the formation by the transmitter coils of the transmitter modules 42 (42') create analog voltage signals also applied to the 24-bit analog-to-digital (A/D) converter 104 through conductor 110 for conversion to digital signals. The electric dipole elements are oriented orthogonally and use the center tap as common for the vertical horizontal field $E_z$ and the two horizontal components $E_x$ and $E_y$, respectively. The A/D converter 104 is mounted directly adjacent to the receiver sensors 100 and 102 for maximum noise reduction. Power to the controller 106, the 24-bit A/D converter 104 and the orientation unit 103 is provided by conductor 94 appearing in the cable segments 52 and 54, and command or control signals are provided through conductor 92. The digitized magnetic and electric field signals from the 24-bit converter 104 are applied to the conductor 96 to provide a path for the received data signals for application to the controller unit 41 and telemetry interface 40 as will be hereinafter further described.

Figure 6:
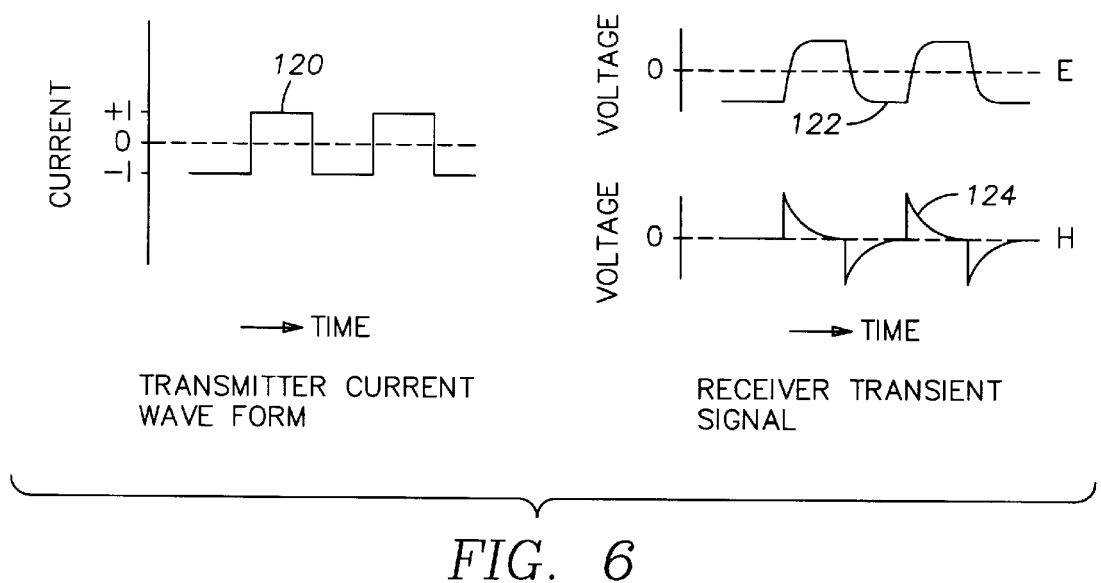
FIG. 6 is a pictorial view of a typical transmitter signal square wave and the corresponding electrical and magnetic transient signals received by the receivers.
Figure 7A:
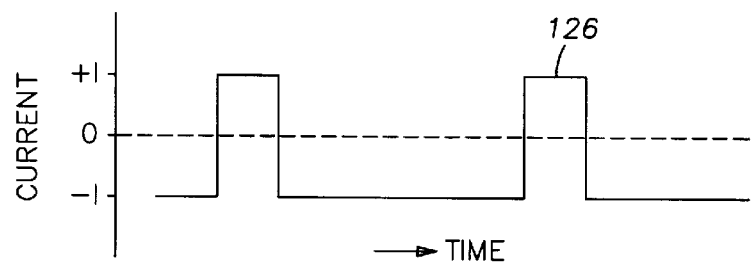
FIGS. 7(a)–7(c) are pictorial views of other transmitter signals having varying wave forms shown in (a)–(c).
Figure 7B:
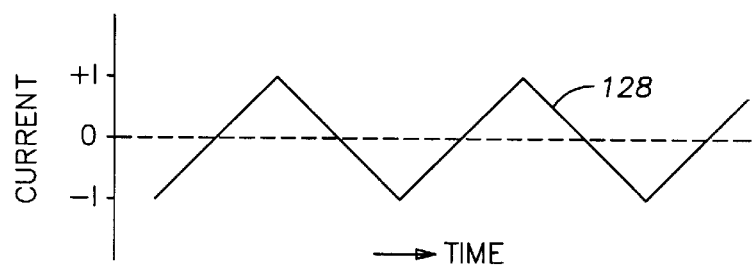
Figure 7C:
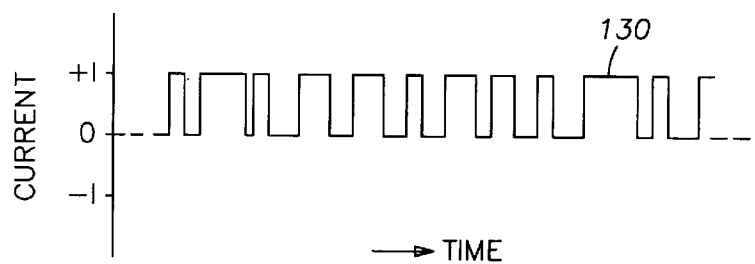
Figure 8:
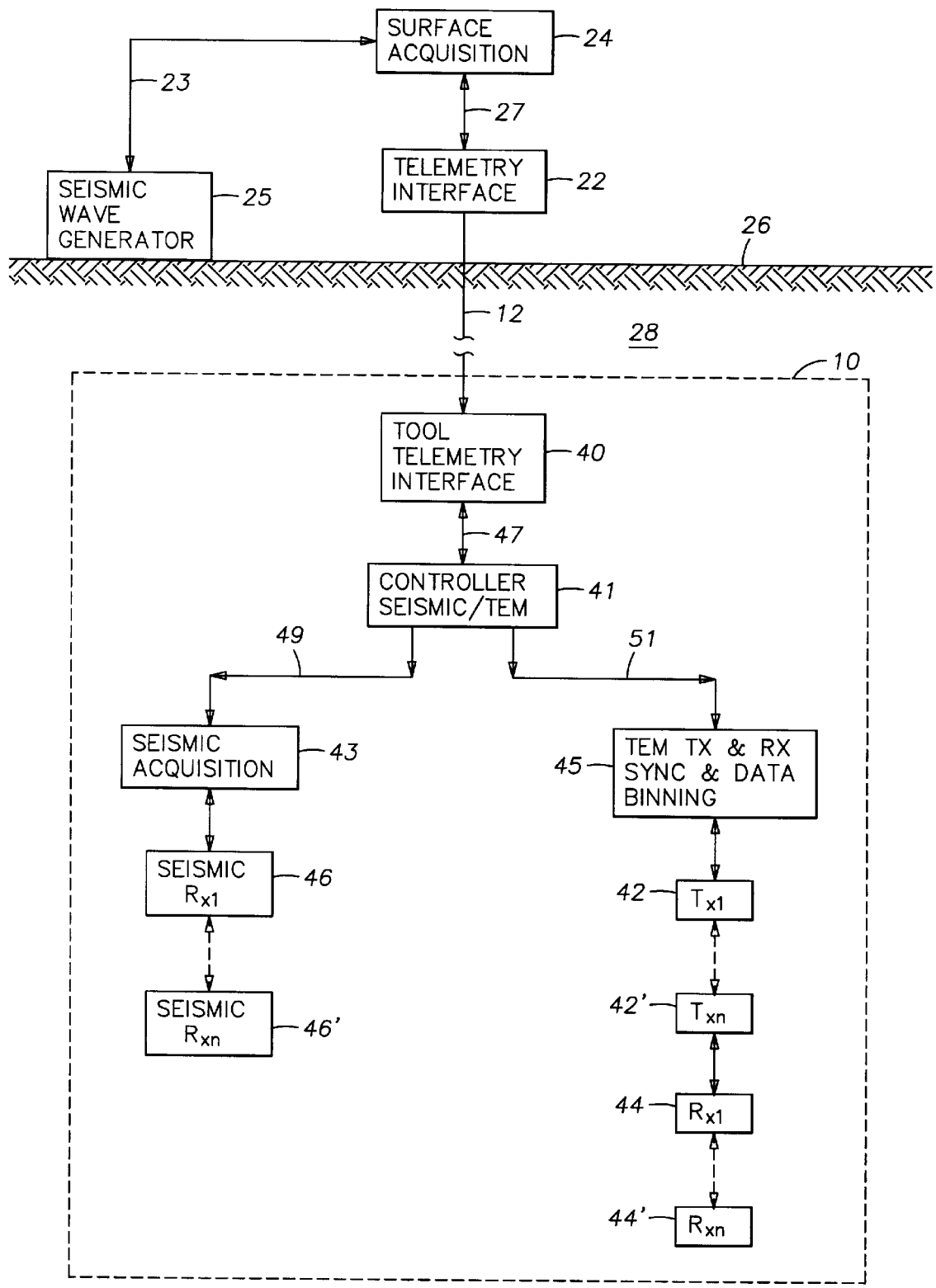
FIG. 8 is a functional block diagram schematic of the control and data circuits of the transient electromagnetic measuring tool according to this invention.

FIG. 6 shows the preferred square wave transmitter current wave form 120 for application by the controllers 74, 76 and 78 to the three-axis electromagnetic transmitter 70 (comprising orthogonal magnetic coils $M_x$, $M_y$ and $M_z$) and the three-axis electric transmitter 72 (comprising orthogonal dipole antenna elements $E_x$, $E_y$ and $E_z$) as the controlled currents $I_x$, $I_y$ and $I_z$. In response to the square wave transmitter signal 102, the received magnetic and electric fields will generate voltage signals in the electromagnetic receiver 100 and the electric field receiver 102 as shown at 124 and 122, respectively. FIG. 7 shows other current waveforms that could be generated by another embodiment of the current controllers 74, 76 and 78 for application to the transmitters 70 and 72, such as one of the waveforms shown at (a) as 126 (pulses), at (b) as 128 (triangular) and at (c) as 130 (pseudo random binary sequence) that would vary the magnetic and electric field components of the received signals for obtaining additional data.

Referring to FIGS. 1, 4, 5 and 6 and 7, the square wave current step induces induction or eddy currents in the formation 28 (FIG. 1) which propagate radially outward with increasing time. Secondary currents are induced in the three-axis electromagnetic receiver 100 (comprising orthogonal coils $M_x$, $M_y$ and $M_z$) in the form of the time derivative of the magnetic field components of the induced current from the transmitter as the receiver transient signal 124. In addition, secondary currents are induced in the three-axis electric receiver 102 (comprising orthogonal dipole antenna elements $E_x$, $E_y$ and $E_z$) in the form of the time derivative of the electric field components of the induced current from the transmitter as the receiver transient signal 122. The signals appearing at the receiver caused by the induction currents in the formation 28 are called transients, because when the transmitter current is switched abruptly, the induced formation currents start at a certain value and then decay or increase with time to a constant level.

The tendency of a alternating currents to flow near the surface of a conductor is known as the "skin effect," and the effective depth of penetration of electromagnetic energy in a conducting medium is known as the "skin depth." The skin depth is also defined as the depth at which the amplitude of a plane wave has been attenuated to thirty-seven percent (37.0%) and can be expressed as follows:

$$\text{skin depth} = \delta = \sqrt{\frac{2}{\sigma\mu\omega}} \quad (1)$$

where:

σ=conductivity (mhos/m)
$\mu$=magnetic permeability (henrys/m)
ω=angular frequency (radians/sec)
however, the conductivity a σ=1/ρ (ohms/m), and substituting into Eq. (1) yields the following:

$$\text{skin depth} = \delta = \sqrt{\frac{2\rho}{\mu\omega}} \quad (2)$$

Since the angular frequency ω=2πf, if the other parameters are known, the relationship of skin depth (δ) to frequency (f) can be determined from Eq. (2) above. If the following parameters are known: ρ=10 ohms/m, $\mu$=4π10⁷ henrys/m, then substituting into Eq. (2) yields the following:

$$\delta = \sqrt{\frac{(2)(10)}{(4\pi 10^{-7})(2\pi f)}} \quad (3)$$

$$\delta = \sqrt{\frac{20 \times 10^7}{8\pi^2 \times f}}$$

$$\delta = 10^4 \sqrt{\frac{1}{4\pi^2 \times f}} \quad (m)$$

As may be seen from Eq. (3), the lower the frequency, the greater the penetration of the electromagnetic energy into the formation. It is anticipated that the maximum transmitter signal frequency will preferably be in the range of 0.1 Hz to 250 Hz, and the maximum frequency component of the received signals will probably be about 1000 Hz.

Since the orthogonal coils $M_x$, $M_y$ and $M_z$ and the orthogonal dipole antenna elements $E_x$, $E_y$ and $E_z$ of the three-axis electromagnetic transmitter 70 and the three-axis electric transmitter 72 are fixed, the relative angular relationship can not be changed in the TEM transmitter module 42. However, changing or varying the frequency, phase and amplitude of the square wave transmitter current signal 120 (FIG. 6) or varying the waveform of the transmitter current signal as shown at 126, 128 and 130 (FIG. 7) applied to the respective coils ($M_x$, $M_y$ and $M_z$) or antenna dipole elements ($E_x$, $E_y$ and $E_z$) can accomplish the equivalent of rotating the angular relationship of the orthogonal coils $M_x$, $M_y$ and $M_z$ and the electric field dipole elements $E_x$, $E_y$ and $E_z$, and thus change the transmitter combined moment in successive different angular directions.

Referring now to FIGS. 1, 4, 5, 6, 7 and 8, the operation of the TEM tool 10 (10') will now be described in detail. The surface acquisition unit 24 is a processor controlled unit for controlling the tool 10 (10') and acquiring TEM data from the receivers 44–44'. The surface acquisition unit 24 is connected via line 27 to a surface telemetry interface circuit 22 which in turn is connected through the wireline cable 12 to the TEM tool 10 (10'). The cable 12 is interconnected to the tool telemetry interface circuit 40 and then to a controller circuit/unit 41. If a surface seismic generator 25 is utilized, it is interconnected to the surface acquisition unit through a line 23 and thence through the telemetry interface 22, cable 12, the tool telemetry interface unit 40 and cable 47 to the controller circuit/unit 41. The controller circuit/unit 41 will advantageously control the acquisition of seismic signals through a seismic acquisition unit 43 interconnected by a cable 49 from the optional seismic receivers 46–46', and/or control the acquisition of TEM signals through a TEM Tx/Rx Sync & Data Binning ("Tx/Rx/Sync") circuit 45 for controlling the firing of the transmitters 42–42' and the acquisition of the received TEM signals from the TEM receivers 44–44'.

The Tx/Rx/Sync circuit 45 accomplishes the synchronization and timing control signals for controlling the transmitter firing cycles to apply the transmitter current signals 120 by the controllers 74, 76 and 78 to the multi-axis electromagnetic transmitter 70 and the multi-axis electric transmitter 72. The circuit 45 also controls the timing and receipt of the receiver signals 122 and 124 by the multi-axis magnetic receiver 100 and the multi-axis electric receiver 102. The circuit 45 also stores the acquired data as a complete time series form until it is requested to transmit the transmitter and receiver data to the surface acquisition unit 24 for further processing. From the foregoing description, it may be seen that the TEM measuring tool 10 (10'), which is capable of deep radial investigation of a formation 28 surrounding a borehole 14, can accomplish the following:

1. detection of hydrocarbons, having a resistivity greater than water, at greater radial distances (R) from the borehole 14 than conventional logging tools, and mapping the distribution thereof in the formation.

2. monitoring the movement of hydrocarbons in the formation 28 by time lapse measurements taken in a single well or in adjacent wells.

3. evaluation of the resistivity of the formation 28 beyond the zone invaded by drilling fluid to yield more accurate evaluation of the undisturbed formation petrophysical characteristics.

4. detection and location of major geologic features in the vicinity of the borehole 14, such as faults, salt domes, and other major structural or stratigraphic features.

5. provision of data which can be interpreted to provide a three-dimensional spatial distribution of formation resistivity around and away from the borehole 14. This type of information could be used to determine the local formation structural dip direction, or to detect faults and hydrocarbon accumulations.

6. provision of reservoir delineation and characterization information in horizontal and high angle deviated boreholes. In such wells, it is particularly desirable to know the proximity of each point of the borehole to the top and bottom of the reservoir zone and to the various/oil/water contacts in the reservoir.

The invention as herein described with respect to the apparatus and methods utilizing the TEM measurement tool 10 (10') only requires access to one well (borehole) to obtain the deep radial penetration TEM data. This is in contrast to crosswell electromagnetic techniques, which require access to two or more wells in the reservoir. In addition, the invention does not require an array of surface measurements or connections (though it could be used in conjunction with these). As a result, special surface site access and surface preparation are not required, and surface noise problems are diminished. By utilizing subsurface measurements only, it is possible to utilize single and multi-axis (x, y & z) electrical and magnetic field components.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

We claim:

1. A transient electromagnetic energy measurement logging tool for disposition in a borehole penetrating earth formations and in wireline communication with associated surface equipment, comprising an electromagnetic transmitter in electrical communication with the surface equipment for applying a transient electromagnetic field to the formations surrounding the borehole including an electromagnetic antenna for inducing induction current components in the formation for radial propagation outwardly from the borehole, and an electric dipole antenna for inducing secondary electric current components in the formation for radial propagation outwardly from the borehole, and a current controller operating in response to control signals received from the surface equipment for applying a current signal having preselected characteristics to said electromagnetic and dipole antennas for generating said magnetic and electric fields in response thereto, an electromagnetic receiver in electrical communication with the surface equipment and spaced axially from said transmitter for detecting said propagating transient induction currents and electric secondary currents generated by said transmitter and generating electrical signals representative of selected characteristics of the formation for application to the surface equipment, including an electromagnetic antenna for detecting said transient induction current components in the formation and inducing electrical signals therein representative of said transient induction current components, and an electric dipole antenna for detecting said electric secondary current components in the formation and inducing electrical signals therein representative of said transient induction current components.

2. The transient electromagnetic energy measurement tool as described in claim 1, wherein said electromagnetic transmitter and electromagnetic receiver comprise a single-axis magnetic and electric transmitter and receiver.

3. The transient electromagnetic energy measurement tool as described in claim 1, wherein said electromagnetic transmitter and electromagnetic receiver comprise multi-axis magnetic and electric transmitters and receivers.

4. The transient electromagnetic energy measurement tool as described in claim 1, further comprising an orientation device disposed with each said electromagnetic transmitter and receiver and in electrical communication with the surface equipment for determining the relative angular orientation thereof and generating electrical signals representative of such orientation for application to the surface equipment.

5. The transient electromagnetic energy measurement tool as described in claim 3, wherein said electromagnetic transmitter is a three-axis electromagnetic transmitter and comprises three orthogonal coils for generating magnetic fields in response to receiving a transmitter current having preselected characteristics and coupling said magnetic fields to the formation for propagation therein, three orthogonal electric dipole antenna elements for generating electric fields in response to receiving a transmitter current having preselected characteristics and coupling said electric fields to the formation for propagation therein, and a current controller operating in response to control signals received from the surface equipment for applying a current signal having preselected characteristics to each of said three orthogonal coils and said three electric field dipole antenna elements for generating said magnetic and electric fields.

6. The transient electromagnetic energy measurement tool as described in claim 5, wherein said transmitter current preselected characteristics are frequency and amplitude.

7. The transient electromagnetic energy measurement tool as described in claim 6, wherein another preselected characteristic of said transmitter current is waveform.

8. The transient electromagnetic energy measurement tool as described in claim 5, wherein said current controller comprises a plurality of current controllers each interconnected to one of said orthogonally disposed magnetic coils and electric dipole antenna elements for applying an electrical current thereto having preselected characteristics.

9. The transient electromagnetic energy measurement tool as described in claim 8, wherein said transmitter current preselected characteristics are frequency and amplitude.

10. The transient electromagnetic energy measurement tool as described in claim 8, wherein another preselected characteristic of said transmitter current is waveform.

11. The transient electromagnetic energy measurement tool as described in claims 5 or 8, wherein each of said current controllers can vary the frequency and amplitude of the electrical current applied to each of said orthogonally disposed magnetic coils and electric dipole antenna elements in response to control signals received from the surface equipment for changing the combined transmitter moment in successive different angular directions to accomplish the equivalent of rotating the angular relationship of said magnetic coils and electric dipole antenna elements.

12. The transient electromagnetic energy measurement tool as described in claims 5 or 8, wherein each of said current controllers can vary the waveform of the electrical current applied to each of said orthogonally disposed magnetic coils and electric dipole antenna elements in response to control signals received from the surface equipment for changing the combined transmitter moment in successive different angular directions to accomplish the equivalent of rotating the angular relationship of said magnetic coils and electric dipole antenna elements.

13. The transient electromagnetic energy measurement tool as described in claim 3, wherein said electromagnetic receiver is a three-axis electromagnetic receiver and comprises three orthogonal coils for detecting said magnetic fields induced in the formation by said transmitter and generating electrical signals representative thereof, and three orthogonal electric dipole antenna elements for detecting said secondary electric fields induced in the formation by said transmitter and generating electrical signals representative thereof, wherein said electrical signals representative of said three orthogonal components of said detected induced magnetic fields and three orthogonal components of said induced electric currents are representative of selected characteristics of the formation.

14. The transient electromagnetic energy measurement tool as described in claim 13, wherein said generated electrical signals representative of said three orthogonal components of said detected induced magnetic fields and induced secondary electric fields are analog signals and the tool further comprises an analog-to-digital converter for receiving said generated analog electrical signals representative of said three orthogonal components of said detected induced magnetic fields and said three orthogonal components of said induced secondary electric fields are converted to digital electrical signals.

15. The transient electromagnetic energy measurement tool as described in claim 1, further comprising a plurality of electromagnetic transmitters in electrical communication with the surface equipment and axially spaced from said first named transmitter and electrically interconnected thereto for applying additional transient electromagnetic fields to the formations surrounding the borehole and inducing therein magnetic and secondary electric fields therein for propagation radially outwardly from the borehole, and a plurality of electromagnetic receivers in electrical communication with the surface equipment and axially spaced from said first named receiver and electrically interconnected thereto for detecting said induced transient magnetic fields and secondary electric fields generated in the formations by said plurality of transmitters and generating electrical signals representative thereof for application to the surface equipment for determining selected characteristics of the formation.

16. The transient electromagnetic energy measurement tool as described in claim 15, wherein said plurality of electromagnetic transmitters and electromagnetic receivers comprise single-axis magnetic and electric transmitters and receivers.

17. The transient electromagnetic energy measurement tool as described in claim 15, wherein said plurality of electromagnetic transmitters and electromagnetic receivers comprise multi-axis magnetic and electric transmitters and receivers.

18. The transient electromagnetic energy measurement tool as described in claim 1, further comprising an energy source for generating and applying selected discrete energy to the earth formations surrounding the borehole for measuring selected characteristics of the formation different than the characteristics measured by said electromagnetic transmitter and electromagnetic receiver, and a receiver axially spaced from said electromagnetic transmitter and electromagnetic receiver and electrically interconnected thereto for receiving said selected discrete energy from said formation surrounding the borehole and generating electrical signals representative thereof for application to the surface equipment for determining additional selected characteristics-of the formation different than the formation characteristics measured by said electromagnetic transmitter and electromagnetic receiver.

19. The transient electromagnetic energy measurement tool as described in claim 18, wherein said energy source comprises a seismic generator generating and applying seismic energy to the earth formations surrounding the borehole, and said receiver comprises at least one seismic receiver axially spaced from said electromagnetic transmitter and electromagnetic receiver and electrically interconnected thereto for receiving said seismic energy reflected from said formation surrounding the borehole for determining additional selected characteristics of the formation.

20. The transient electromagnetic energy measurement tool as described in claim 19, wherein said receiver comprises at least one three-axis seismic receiver for receiving components of said seismic energy reflected from said formation surrounding the borehole for determining additional selected characteristics of the formation.

21. A transient electromagnetic energy measurement logging tool for disposition in a borehole penetrating earth formations and in wireline communication with associated surface equipment, comprising an electromagnetic transmitter in electrical communication with the surface equipment for applying a transient electromagnetic field to the formations surrounding the borehole, including an electromagnetic antenna for inducing induction current components in the formation for radial propagation outwardly from the borehole, and an electric dipole antenna for inducing secondary electric current components in the formation for radial propagation outwardly from the borehole, and a current controller operating in response to control signals received from the surface equipment for applying a current signal having preselected characteristics to said electromagnetic and dipole antennas for generating said magnetic and electric fields in response thereto, and a multi-axis electromagnetic receiver in electrical communication with the surface equipment and spaced axially from said transmitter for detecting components of said propagating transient induction currents and electric secondary currents generated by said transmitter and generating electrical signals representative of selected characteristics of the formation for application to the surface equipment, including a multi-axis electromagnetic antenna for detecting multiple transient induction current components in the formation and inducing electrical signals therein representative of said multiple transient induction current components, and a multi-axis electric dipole antenna for detecting multiple electric secondary current components in the formation and inducing electrical signals therein representative of said transient induction current components.

22. The transient electromagnetic energy measurement tool as described in claim 21, wherein said electromagnetic transmitter comprises multi-axis magnetic and electric transmitters.

23. The transient electromagnetic energy measurement tool as described in claim 1, further comprising an orientation device disposed with each said electromagnetic transmitter and receiver and in electrical communication with the surface equipment for determining the relative angular orientation thereof and generating electrical signals representative of such orientation for application to the surface equipment.

24. The transient electromagnetic energy measurement tool as described in claim 22, wherein said electromagnetic transmitter is a three-axis electromagnetic transmitter and comprises three orthogonal coils for generating magnetic fields in response to receiving a transmitter current having preselected characteristics and coupling said magnetic fields to the formation for propagation therein, three orthogonal electric dipole antenna elements for generating electric fields in response to receiving a transmitter current having preselected characteristics and coupling said electric fields to the formation for propagation therein, and a current controller operating in response to control signals received from the surface equipment for applying a current signal having preselected characteristics to each of said three orthogonal coils and said three electric field dipole antenna elements for generating said magnetic and electric fields.

25. The transient electromagnetic energy measurement tool as described in claim 24, wherein said transmitter current preselected characteristics are frequency and amplitude.

26. The transient electromagnetic energy measurement tool as described in claim 25, wherein another preselected characteristic of said transmitter current is waveform.

27. The transient electromagnetic energy measurement tool as described in claim 24, wherein said current controller comprises a plurality of current controllers each interconnected to one of said orthogonally disposed magnetic coils and electric dipole antenna elements for applying an electrical current thereto having preselected characteristics.

28. The transient electromagnetic energy measurement tool as described in claim 27, wherein said transmitter current preselected characteristics are frequency and amplitude.

29. The transient electromagnetic energy measurement tool as described in claim 28, wherein another preselected characteristic of said transmitter current is waveform.

30. The transient electromagnetic energy measurement tool as described in claims 24 or 27, wherein each of said current controllers can vary the frequency and amplitude of the electrical current applied to each of said orthogonally disposed magnetic coils and electric dipole antenna elements in response to control signals received from the surface equipment for changing the combined transmitter moment in successive different angular directions to accomplish the equivalent of rotating the angular relationship of said magnetic coils and electric dipole antenna elements.

31. The transient electromagnetic energy measurement tool as described in claims 24 or 27, wherein each of said current controllers can vary the waveform of the electrical current applied to each of said orthogonally disposed magnetic coils and electric dipole antenna elements in response to control signals received from the surface equipment for changing the combined transmitter moment in successive different angular directions to accomplish the equivalent of rotating the angular relationship of said magnetic coils and electric dipole antenna elements.

32. The transient electromagnetic energy measurement tool as described in claim 21, wherein said multi-axis electromagnetic antenna comprises three orthogonal coils for detecting three magnetic field components induced in the formation by said electromagnetic energy transmitter for generating electrical signals representative thereof, and wherein said multi-axis dipole electric current antenna comprises three orthogonal electric dipole antenna elements for detecting three secondary electric field components induced in the formation by said electric dipole transmitter and generating electrical signals representative thereof, wherein said electrical signals representative of said three orthogonal components of said detected induced magnetic fields and three orthogonal components of said induced electric currents are representative of selected characteristics of the formation.

33. The transient electromagnetic energy measurement tool as described in claim 32, wherein said generated electrical signals representative of said three orthogonal components of said detected induced magnetic fields and induced secondary electric fields are analog signals and the tool further comprises an analog-to-digital converter for receiving said generated analog electrical signals representative of said three orthogonal components of said detected induced magnetic fields and said three orthogonal components of said induced secondary electric fields are converted to digital electrical signals.

34. The transient electromagnetic energy measurement tool as described in claim 21, further comprising a plurality of electromagnetic transmitters in electrical communication with the surface equipment and axially spaced from said first named transmitter and electrically interconnected thereto for applying additional transient electromagnetic fields to the formations surrounding the borehole and inducing therein magnetic and secondary electric fields therein for propagation radially outwardly from the borehole, and a plurality of multi-axis electromagnetic receivers in electrical communication with the surface equipment and axially spaced from said first named receiver and electrically interconnected thereto for detecting said induced transient magnetic fields and secondary electric fields generated in the formations by said plurality of transmitters and generating electrical signals representative thereof for application to the surface equipment for determining selected characteristics of the formation.

35. The transient electromagnetic energy measurement tool as described in claim 34, wherein said plurality of electromagnetic transmitters comprise single-axis magnetic and electric transmitters.

36. The transient electromagnetic energy measurement tool as described in claim 34, wherein said plurality of electromagnetic transmitters comprise multi-axis magnetic and electric transmitters.

37. The transient electromagnetic energy measurement tool as described in claim 21, further comprising an energy source for generating and applying selected discrete energy to the earth formations surrounding the borehole for measuring selected characteristics of the formation different than the characteristics measured by said electromagnetic transmitter and electromagnetic receiver, and a receiver axially spaced from said electromagnetic transmitter and electromagnetic receiver and electrically interconnected thereto for receiving said selected discrete energy from said formation surrounding the borehole and generating electrical signals representative thereof for application to the surface equipment for determining additional selected characteristics of the formation different than the formation characteristics measured by said electromagnetic transmitter and electromagnetic receiver.

38. The transient electromagnetic energy measurement tool as described in claim 37, wherein said energy source comprises a seismic generator generating and applying seismic energy to the earth formations surrounding the borehole, and said receiver comprises at least one seismic receiver axially spaced from said electromagnetic transmitter and electromagnetic receiver and electrically interconnected thereto for receiving said seismic energy reflected from said formation surrounding the borehole for determining additional selected characteristics of the formation.

39. The transient electromagnetic energy measurement tool as described in claim 38, wherein said receiver comprises at least one three-axis seismic receiver for receiving components of said seismic energy reflected from said formation surrounding the borehole for determining additional selected characteristics of the formation.

40. A method of measuring transient electromagnetic energy in earth formations surrounding a borehole penetrating such formations, comprising the steps of controlling preselected characteristics of a transmitter current signal, generating electromagnetic energy in response to receiving said transmitter current signal having said preselected characteristics, applying said electromagnetic energy to the formation for inducing selected transient magnetic field and electric field components therein, detecting said transient magnetic field and electric field components generated by said electromagnetic energy transmitted into the formation, and generating electrical signals representative of said detected transient magnetic field and electric field components for determining selected characteristics of the formation.

41. The method of measuring transient electromagnetic energy as described in claim 40, wherein said detecting step comprises detecting said induced transient magnetic field components in the formation generating electrical signals representative of said detected induced transient magnetic field components, detecting said induced transient electric field components in the formation generating electrical signals representative of said detected induced transient electrical field components.

* * * * *